United States Patent [19]
Magendie et al.

[11] Patent Number: 5,774,418
[45] Date of Patent: Jun. 30, 1998

[54] METHOD FOR ON-LINE ACOUSTIC LOGGING IN A BOREHOLE

[75] Inventors: Jean Magendie; Elyes Draoui, both of Pau, France

[73] Assignee: Elf Aquitaine Production, France

[21] Appl. No.: 826,499

[22] Filed: Apr. 3, 1997

Related U.S. Application Data

[63] Continuation of Ser. No. 569,165, filed as PCT/FR95/00547, Apr. 26, 1995, abandoned.

[30]     Foreign Application Priority Data

Apr. 28, 1994  [FR]  France ................................. 94 05166

[51] Int. Cl.[6] ........................................................ G01V 1/40
[52] U.S. Cl. ................................ 367/25; 367/41; 367/57
[58] Field of Search ................................ 367/25, 41, 57, 367/82; 181/102; 175/40, 45

[56]             References Cited

U.S. PATENT DOCUMENTS

| 4,715,451 | 12/1987 | Bseisu et al. | 175/40 |
|---|---|---|---|
| 4,926,391 | 5/1990 | Rector et al. | 367/41 |
| 4,965,774 | 10/1990 | Ng et al. | 367/75 |
| 5,055,837 | 10/1991 | Abdallah et al. | 367/83 |
| 5,222,048 | 6/1993 | Groos et al. | 367/32 |
| 5,303,203 | 4/1994 | Kingman | 367/82 |
| 5,358,059 | 10/1994 | Ho | 175/45 |

FOREIGN PATENT DOCUMENTS 0409304   1/1991   European Pat. Off. .

OTHER PUBLICATIONS

Rector et al., "the use of Drill-bit Energy as a Downhole Seismic Source", Geophysics, vol. 56, No. 5, pp. 628-634 May 1991.

*Primary Examiner*—Ian J. Lobo
*Attorney, Agent, or Firm*—Bacon & Thomas

[57]             ABSTRACT

An instant acoustic logging method for use in oil drilling is disclosed in which a drill bit arranged at one end of a drill string and rotated in a well is used as the acoustic source. The method comprises the steps of measuring, at the top of the string, the vibration generated therein by the rotating drill bit, sensing acoustic signals from the drill bit at least one point on the ground away from said drill bit, and processing the signals to provide data on the rock around the well. The method comprises an additional preliminary step of processing the vibration measured at the top of the string to determine the nature of the pilot signals from the drill bit, the data on the rock around the well being obtained by comparing the acoustic signals sensed on the ground with the pilot signals from the drill bit.

3 Claims, 4 Drawing Sheets

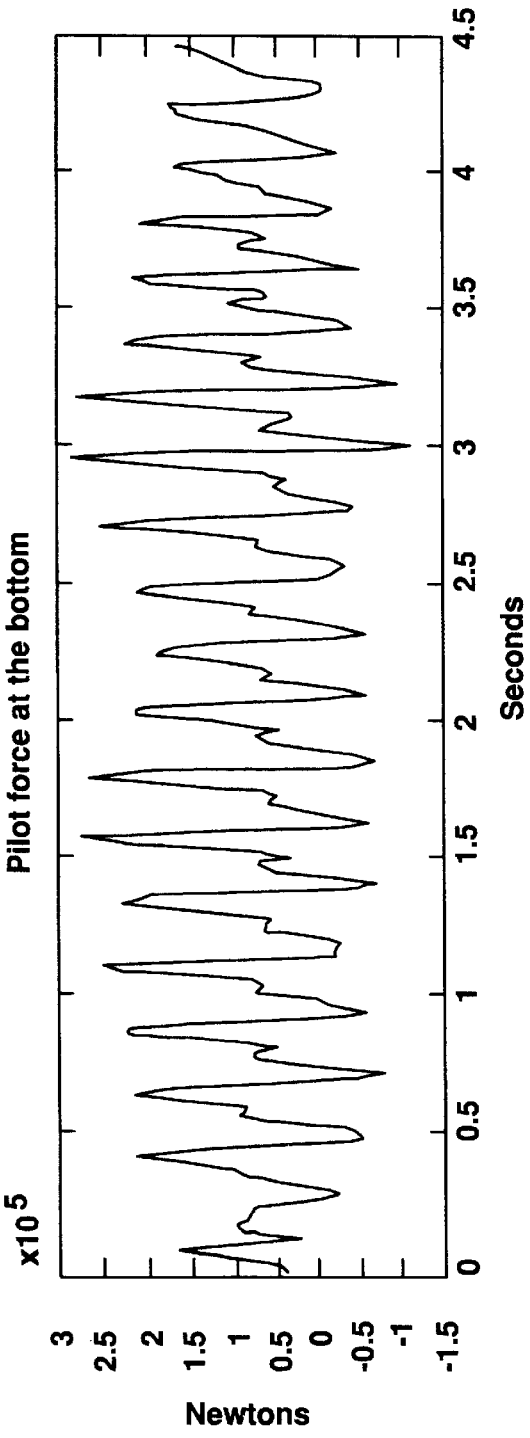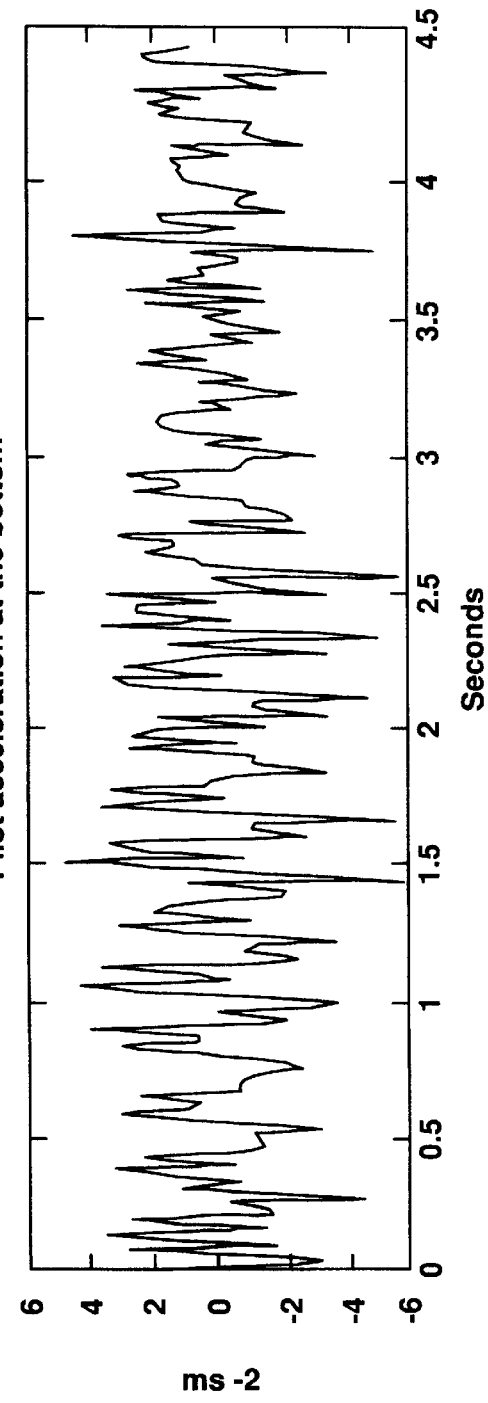

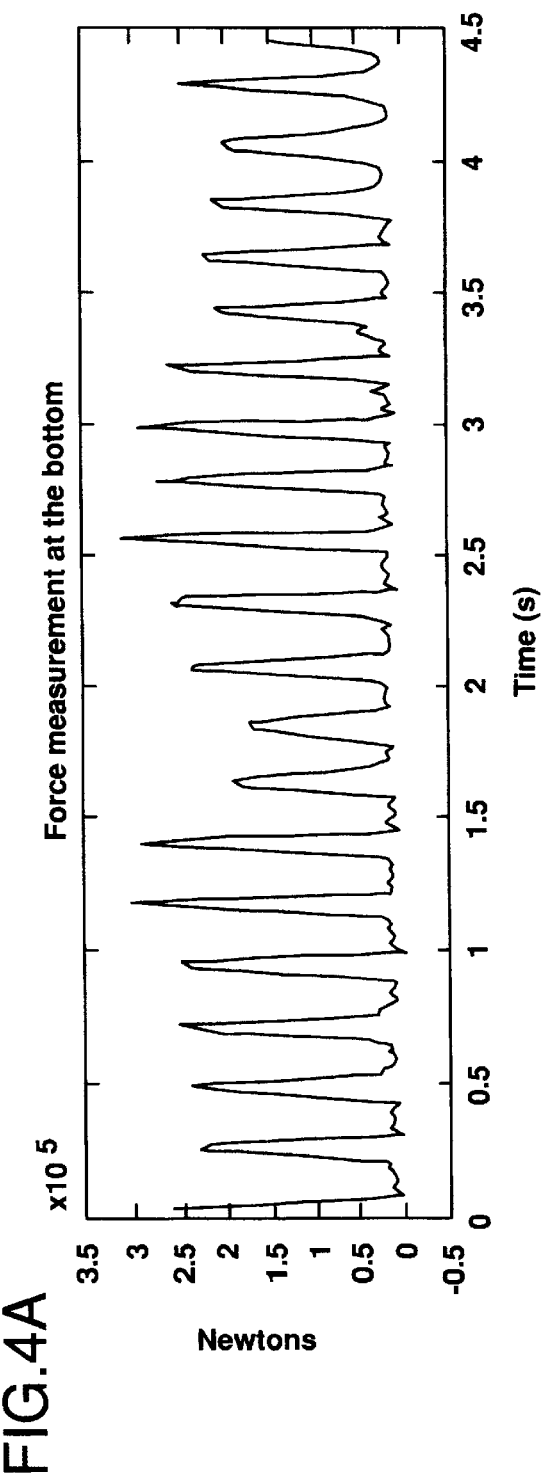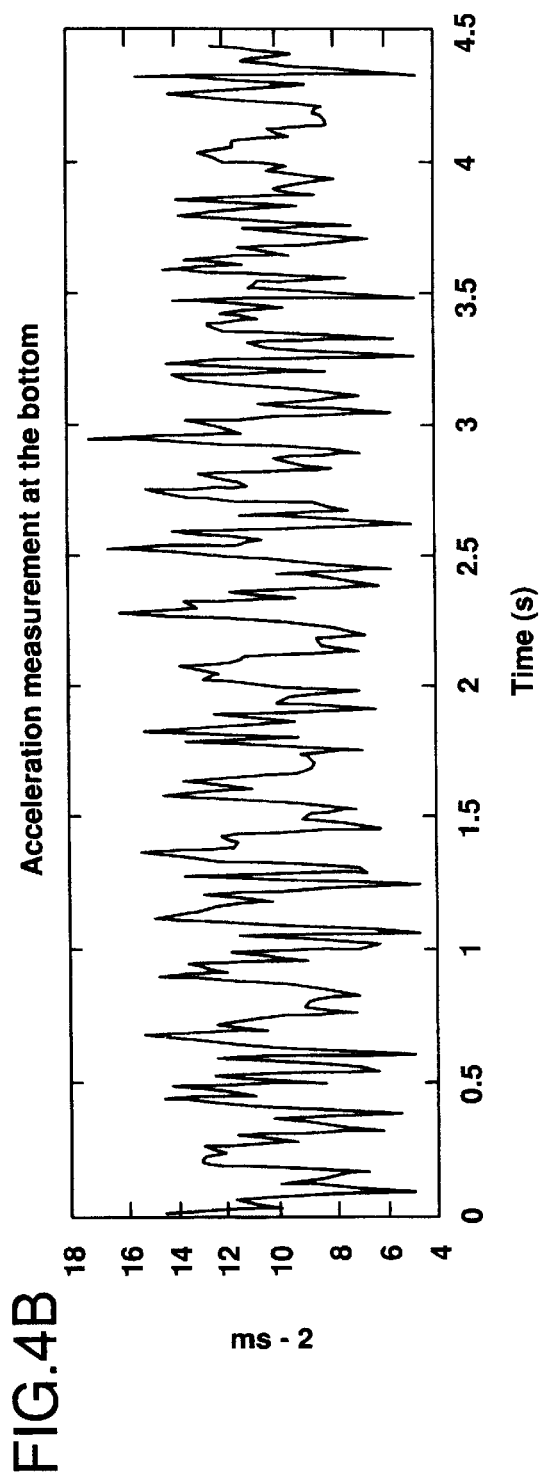
FIG.4A
FIG.4B

METHOD FOR ON-LINE ACOUSTIC LOGGING IN A BOREHOLE

This application is a continuation of U.S. patent application Ser. No. 08/569,165, filed as PCT/FR95/00547, Apr. 26, 1995, now abandoned.

BACKGROUND OF THE INVENTION

1. Field of the Invention

The present invention relates to a method for on-line acoustic logging in a borehole and, more generally, to a method for continuously measuring the acoustic characteristics of subsurface strata surrounding the borehole.

2. Description of Related Art

During drilling operations, a number of physical measurements called logs are taken on the subsurface strata.

Some of these logs are made during the drilling operation proper, and these are on-line logs, whereas others are made during interruptions in the drilling operations, and these are off-line logs.

The logs thus made make it possible to improve the knowledge of the formations drilled through, this being both in order to conduct the drilling better and to form a direct contribution to the prospecting of hydrocarbon and other deposits.

For on-line logging, it has been proposed to use the drilling bit itself, instead of a specific acoustic emitter, as the vibration source. In effect, drilling bits, for example roller drilling bits, work on the cutting front of a borehole by percussion, and this percussion gives rise to acoustic signals.

Document FR-A-2,564,980 describes an on-line acoustic logging method in which the drilling bit is used as the acoustic signal source, abrasion or destruction of the rock by the teeth of the rollers generating both vibrations in the drilling pipe string and in the subsoil through which the borehole passes. These acoustic vibrations are picked up simultaneously by a receiver arranged at the upper end of the pipe string and by receivers arranged on the ground at points remote from the borehole. Processing these signals makes it possible, by comparing them with each other, to obtain information regarding the rock surrounding the hole, this information being similar to that provided by acoustic logs or by seismic-type measurements in holes.

However, the method of document FR-A-2,564,980 has drawbacks insofar as interpretation is carried out by comparing two signals which are both deformed when they propagate from the bit to the surface: one travelling through numerous rock strata with different densities, and the other travelling along the drilling pipe string.

The information relating to the rock surrounding the borehole which is obtained with this type of method would be more relevant and more accurate if it were possible to compare the signal picked up by the receivers arranged on the ground with the signal, called the pilot signal, emitted by the drilling bit, rather than with the signal picked up at the upper end of the pipe string, which signal is itself deformed with respect to the pilot signal.

SUMMARY OF THE INVENTION

The subject of the present invention is therefore an on-line acoustic logging method in which, on the basis of measurements taken at the upper end of the pipe string, the nature of the pilot signal emitted by the drilling bit is determined in order to make it possible to compare this pilot signal with the signals picked up on the surface.

To this end, the invention provides an on-line acoustic logging method, in which a drilling bit arranged at one end of a drilling string and rotated in a hole is used as the acoustic source, the method including the steps consisting in measuring, at the upper end of the string, the vibrations produced in the string by the rotating drilling bit, in picking up, at at least one point on the ground remote from the bit, acoustic signals emitted by the bit, and in processing these signals in order to obtain data relating to the rock surrounding the hole, which method is characterized in that it includes an additional prior step of processing the vibrations measured at the upper end of the string, in order to deduce the nature of the pilot signals emitted by the bit, the data relating to the rock surrounding the hole being obtained by comparing the acoustic signals picked up on the ground with the pilot signals emitted by the bit.

Such a method has the advantage of considerably increasing the relevance and the accuracy of the information relating to the rock surrounding the borehole.

Other characteristics and advantages of the present invention will emerge on reading the following description, given by way of indication and without any implied limitation, as well as the appended drawings.

DESCRIPTION OF THE DRAWINGS

FIG. 3 represents two curves, of force and of acceleration, determined according to the present invention, and FIG. 4 represents two curves, of force and of acceleration, recorded at the hole bottom.

DETAILED DESCRIPTION OF THE INVENTION

Figure 1:
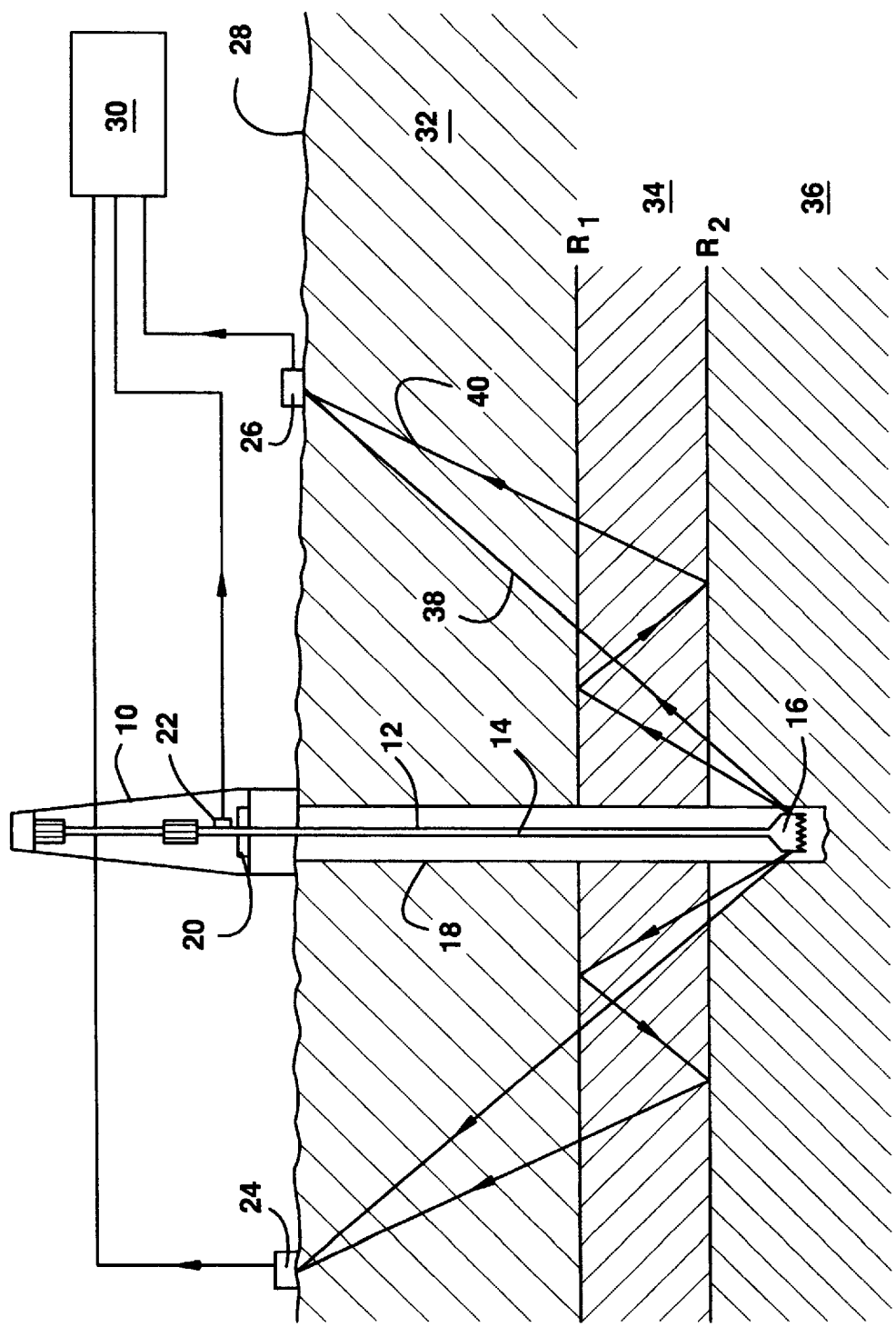
FIG. 1 is a schematic sectional representation of the subsoil and of the means employed in the method according to the invention.

As represented in FIG. 1, a drilling mast 10 supports a drilling string, represented overall at 12, which comprises a pipe string 14 and a drilling bit 16. The drilling string 12, extending in a hole 18 in the subsoil, is rotated by a turntable 20 arranged at the bottom of the mast 10.

The drilling string 12 is equipped at its upper end with a set of sensors 22 which is preferably arranged above the turntable 20. Sensors 24, 26, such as geophones, are arranged on the surface of the ground 28 equidistant from the borehole 18. The set of sensors 22 and the geophones 24, 26 are connected by cables, or by telemetry, to a processing unit 30 which will be described in more detail below.

Rotation/percussion of the drilling bit 16 which, in the example illustrated, is of the roller type, generates waves which propagate continuously along two main routes.

The first route consists of the drilling string 12, the vibrational waves being picked up by the set of sensors 22. The second route consists of the formation or formations which have been drilled through and are situated between the bit 16 and the surface 28 of the ground. In the example illustrated, it is assumed that the subsoil is divided into three subsurface formations 32, 34 and 36 which define reflectors $R_1$ and $R_2$.

The vibrational energy transmitted to the geophone 26 by the drilling bit 16, which is then considered as a seismic source, can follow several different acoustic routes. The first acoustic route 38 is direct and corresponds to first arrival at the geophone 26. A second acoustic route 40 reaches the same geophone 26 after successive reflections at the reflectors $R_1$ and $R_2$. The times at which the signals produced by the elastic waves propagating along one of the acoustic routes 38, 40 are recorded will be offset in time to a varying degree depending on the number of reflections taking place.

Furthermore, the vibrational waves generated by the drilling bit 16 and propagating via the drilling string 12 are picked up by the set of sensors 22. Comparing the signals received by the geophones 24, 26 and by the set of sensors 22 makes it possible to determine the nature of the various formations situated around the borehole 18.

According to the invention, in order to improve the accuracy of the method, prior processing of the signal picked up at the upper end of the string 12 by the sensors 22 is carried out in order to determine the exact nature of the pilot signal emitted by the drilling bit 16, before comparing this pilot signal with the signals picked up by the geophones 24, 26.

The origin of the signal received on the surface is, in particular, low-frequency emissions generated by the bit and depending on the geometry and/or the speed of rotation of the bit.

The pilot signal is determined in two steps. The first step consists in checking the quality of the transmission of the signal emitted by the bit. This is done by checking that the low-frequency components generated by the bit form a significant part, for example of the order of 50%, in the energy of the signal measured at the surface.

After the quality of the signal has been confirmed, the pilot signal is determined on the basis of acceleration and force measurements taken at the upper end of the string 12 by the sensors 22. In order to do this, the string is considered as consisting of a series of pipes, each of which is represented by an elementary transfer function $M_{pipe}$. The overall transfer function $M_{string}$ of the string is obtained by taking the product of the elementary transfer functions.

The force pilot signal ($F_{pilot}$) or the acceleration pilot signal ($A_{pilot}$) is determined by multiplying the corresponding surface signal ($F_{surface}$ or $A_{surface}$) by the overall transfer matrix $M_{string}$.

Each elementary transfer matrix $M_{pipe}$ is expressed as follows:

$$M_{pipe} = \begin{pmatrix} ch(g \cdot L) & \frac{-j \cdot Z \cdot sh(g \cdot L)}{W} \\ \frac{-W \cdot sh(g \cdot L)}{j \cdot Z} & ch(g \cdot L) \end{pmatrix}$$

With:

$$g^2 = -\left(\frac{W}{a}\right)^2 + \frac{j \cdot W \cdot c}{(\rho \cdot S \cdot a)^2}$$

$$Z^2 = (\rho \cdot S \cdot a)^2 - \frac{j \cdot c}{W} \rho \cdot S \cdot a^2$$

With:
L: length of the pipe.
a: propagation velocity of the vibrations in the pipe.
S: cross-sectional area of the pipe.
c: damping of the vibrations in the pipe.
ρ: density of the pipe.
j: complex ($j^2 = -1$).

Thus, by applying this transfer matrix to the force and acceleration signals measured on the surface, it is possible to determine the force and acceleration values emitted by the bit. These values can then be compared with the same measurements taken by the geophones.

Figure 2A:
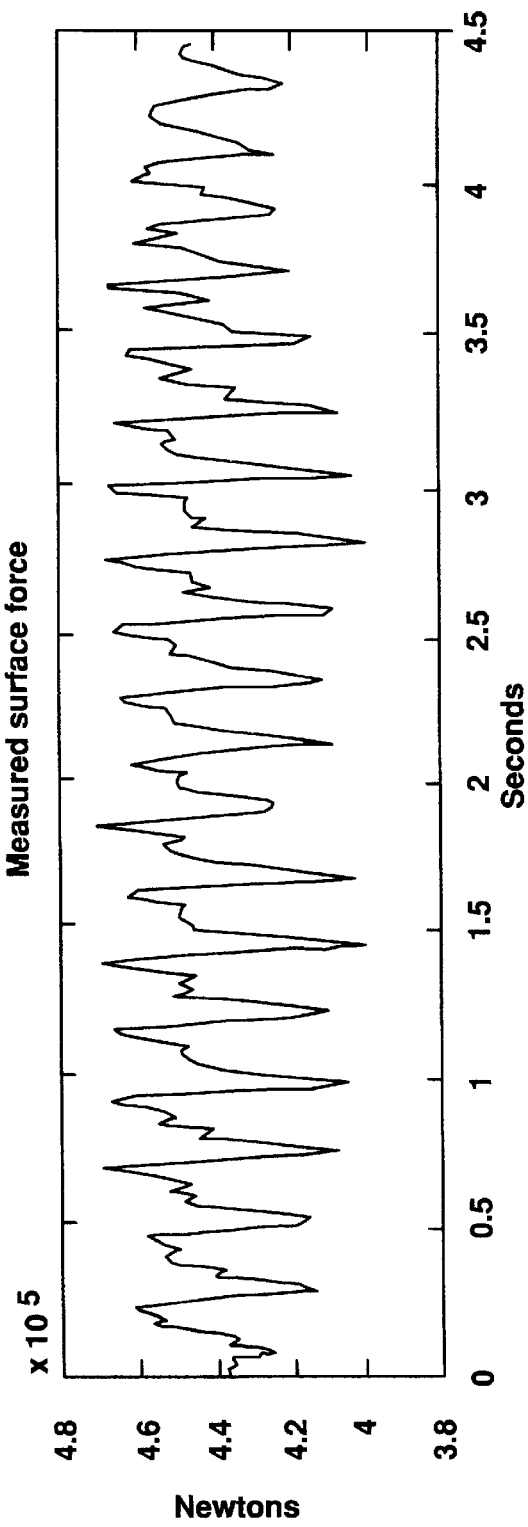
FIG. 2 represents two curves, of force and of acceleration, recorded on the surface.
Figure 2B:
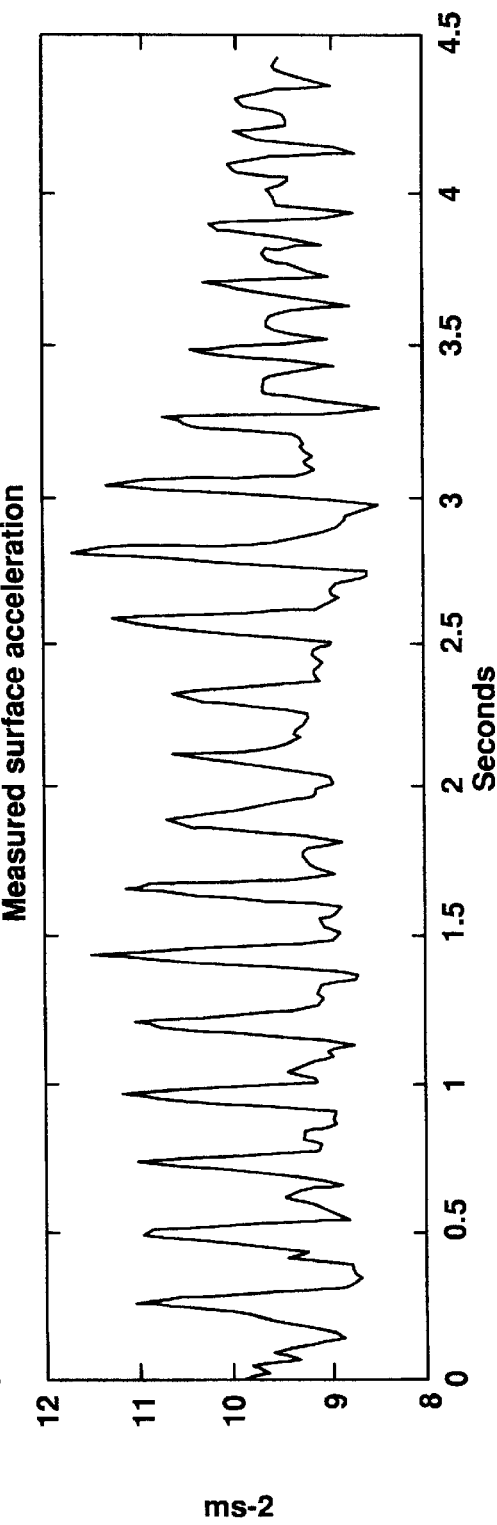

FIG. 2 includes two curves illustrating the change as a function of time of the force and acceleration which are measured on the surface. FIG. 3 includes two similar curves illustrating the force and the acceleration which are determined using the method according to the invention. Finally, FIG. 4 includes two curves similar to those in FIG. 3, illustrating force and acceleration measurements recorded by a measuring instrument which, for experimentation, was arranged just above the drilling bit. As can be observed, the values determined by the method of the invention correspond satisfactorily to the measurements recorded at the hole bottom.

The method according to the invention has the additional advantage of improving the seismic range beyond the drilling bit.

The sensors 22 may either be axial sensors intended to measure the dynamic axial force and the axial acceleration of the string 12, or torsion sensors intended to measure the torque and torsional acceleration.

We claim:

1. An on-line acoustic logging method, in which a drilling bit arranged at one end of a drilling string and rotated in a hole is used as the acoustic source, the method comprising the steps of:

measuring, at the upper end of the string, the acceleration and force of the vibrations produced in the string by the rotating drilling bit, processing the acceleration and force measurements of the vibrations measured at the upper end of the string to deduce the pilot signals emitted by the bit downhole, receiving acoustic signals emitted by the bit at at least one point on the ground remote from the bit, and processing these signals to obtain data relating to the rock surrounding the hole by comparing the acoustic signals received on the ground with the deduced pilot signals, wherein the acceleration and force measurements of the vibrations measured at the upper end of the string are processed by applying to them the following transfer function to determine the force and acceleration values emitted by the bit downhole:

$$M_{pipe} = \begin{pmatrix} ch(g \cdot L) & \frac{-j \cdot Z \cdot sh(g \cdot L)}{W} \\ \frac{-W \cdot sh(g \cdot L)}{j \cdot Z} & ch(g \cdot L) \end{pmatrix}$$

in which:

$$g^2 = -\left(\frac{W}{a}\right)^2 + \frac{j \cdot W \cdot c}{(\rho \cdot S \cdot a)^2}$$

$$Z^2 = (\rho \cdot S \cdot a)^2 - \frac{j \cdot c}{W} \rho \cdot S \cdot a^2$$

and in which:
L: length of the pipe
a: propagation velocity of the vibrations in the pipe.
S: cross-sectional areal of the pipe.
c: damping of the vibrations in the pipe.
ρ: density of the pipe.
j: complex ($j^2 = -1$).

2. The method according to claim 1, wherein axial sensors are used to measure the dynamic axial force and axial acceleration of the vibrations produced in the string.

3. The method according to claim 1, wherein torsion sensors are used to measure the torque and torsional accelerations of the vibrations produced in the string.

* * * * *